United States Patent
Wieser

(10) Patent No.: US 9,412,025 B2
(45) Date of Patent: Aug. 9, 2016

(54) SYSTEMS AND METHODS TO CLASSIFY MOVING AIRPLANES IN AIRPORTS

(71) Applicant: Siemens Aktiengesellschaft, Munich (DE)

(72) Inventor: Dieter Wieser, Kuesnacht (CH)

(73) Assignee: SIEMENS SCHWEIZ AG, Zürich (CH)

( * ) Notice: Subject to any disclaimer, the term of this patent is extended or adjusted under 35 U.S.C. 154(b) by 300 days.

(21) Appl. No.: 13/687,828

(22) Filed: Nov. 28, 2012

(65) Prior Publication Data

US 2014/0146998 A1    May 29, 2014

(51) Int. Cl.
*G06K 9/00* (2006.01)
*G06K 9/32* (2006.01)

(52) U.S. Cl.
CPC .......... *G06K 9/00771* (2013.01); *G06K 9/3241* (2013.01)

(58) Field of Classification Search
None
See application file for complete search history.

(56) References Cited

U.S. PATENT DOCUMENTS

2012/0059499 A1 *    3/2012  Uchikura et al. ............... 700/98

OTHER PUBLICATIONS

Bertozzi, Massimo, et al. "Pedestrian detection for driver assistance using multiresolution infrared vision." Vehicular Technology, IEEE Transactions on 53.6 (2004): 1666-1678.*
Besada, Juan A., et al. "Image-based automatic surveillance for airport surface." 4th International Conference on Information Fusion, Fusion. 2001.*
Ossama El Badawy and Mohamed Kamel. Shape-Based Image Retrieval Applied to Trademark Images, International Journal of Image and Graphics, vol. 2, No. 3, 2002, pp. 375-393.*
Linear Classifier, Wikipedia: the free encyclopedia, Aug. 12, 2011.*
Fisher, "Opening, Hypermedia Image Processing Reference," Captured by Internet Archive on Apr. 2, 2010, http://web.archive.org/web/20100402173101/http://homepages.inf.ed.ac.uk/rbf/HIPR2/open.htm.*
Mandellos, N A et al., "A Background Subtraction Algorithm for Detecting and Tracking Vehicles", Expert Systems with Applications, Oxford, GB, vol. 38, No. 3, Mar. 1, 2011, pp. 1619-1631, XP027456205, ISSN; 0957-4174. DPO" 10.1016/J. ESWA.2010.07. 083. (13 pages).
PCT Search Report for application No. PCT/EP2013/074895, dated May 28, 2014. (8 pages).
Survey of Algorithms for the Convex Hull Problem, Valentina Bayer, Oregon State University, Mar. 19, 1999, 20 pgs.
Xianquan Zhang, Zhenjun Tang, A fast Convex Hull Algorithm for Binary Image, Informatica 34 (2010) 369-376.

* cited by examiner

*Primary Examiner* — Stephen R Koziol
*Assistant Examiner* — Raphael Schwartz

(57) ABSTRACT

A sequence of video images is generated of a pavement area of an airport which contains one or more objects. A processor accesses a background model of the pavement area and determines in a current image a single cluster of foreground pixels that is not part of the background model and assigns a first value to each foreground pixel in the cluster to create a foreground mask. The background model is updated by learning new conditions. A convex hull is generated from the foreground mask. A ratio is determined from pixels captured by the complex hull and pixels in the foreground mask. A ratio higher than a threshold value indicates an object not being an airplane and an alert is displayed on a computer display. Images may be thermal images. A surveillance system based on the calculated ratio is disclosed.

18 Claims, 7 Drawing Sheets

SYSTEMS AND METHODS TO CLASSIFY MOVING AIRPLANES IN AIRPORTS

FIELD OF THE INVENTION

The present invention relates generally to recognizing by a processor an object in a scene. The invention in particular relates to segmenting a processed image of an object in a scene taken by a security camera from its background and labeling or classifying the segmented processed image, for instance, as an airplane.

BACKGROUND OF THE INVENTION

Certain areas of structures, such as airports, require almost constant monitoring and surveillance during day and night, for instance for security reasons. These areas have well defined movement and traffic. For example, airport runways, roll ways and park ways may have, at some times traffic of airplanes and of no other objects such as cars and trucks. However, at other times, the traffic may include objects other than airplanes, such as cars, trucks and persons. When these objects share this space at airports, this could present an operational risk or a security threat.

It would be beneficial if an effective automatic camera surveillance system connected to a processor could quickly and efficiently analyze an image and determine that an object not being an airplane has moved or is moving in a restricted space under surveillance. Currently, such effective visual detection and surveillance camera systems to determining an object moving in an area of an airport are believed not to be available.

Accordingly, novel and improved methods and computer systems integrated with a camera are required to automatically and easily detect an object not being an airplane that is moving in an area of an airport.

SUMMARY OF THE INVENTION

In accordance with one aspect the present invention, systems and methods to monitor paved areas in airports to determine if objects other than airplanes are present on the paved areas are provided. In accordance with one of the aspects of the present invention, a method for labeling an object in an image of a scene includes the following steps.

First, the processor receives, directly or indirectly (for example from memory), image data of the object in a scene. Then the processor determines a foreground mask of the object from a background model. Then the processor determines a convex hull of the object from the foreground mask. The processor then labels the object in the image based on processing the convex hull. In accordance with another aspect of the present invention, the foreground mask is formed by the processor comparing each of a plurality of pixels in the image data of the object with a corresponding pixel in the background to determine whether each of the plurality of pixels is a foreground pixel.

In accordance with a further aspect of the present invention, all foreground pixels have a first pixel value and belong to a single cluster of foreground pixels. In accordance with yet another aspect of the present invention, all background pixels have a second pixel value.

In accordance with another aspect of the present invention, the background is periodically updated by the processor. The updated background can be an accumulated background.

In accordance with one aspect of the present invention, the object is labeled by the processor based on a ratio of foreground pixels in the foreground mask and a total number of pixels captured by the convex hull. In accordance with another aspect of the present invention, the processor compares the ratio with a threshold value. In one embodiment of the present invention, when the ratio is greater than 0.75 the processor determines that the object is not an airplane.

In accordance with a further aspect of the present invention, the processor sets an alarm when the processor determines that the object is not an airplane. Also, in accordance with an aspect of the present invention, the scene is of an airport and the object is not an airplane and the processor provides on a map displayed on a computer display a location where the object is located.

In accordance with another aspect of the present invention, a system for labeling an object in an image of a scene is provided. The system includes a memory, a camera and a processor. The processor accesses the memory to obtain the background model of the scene and receives an image of the scene with an object in the scene directly or indirectly from the camera. The processor processes the image in the manner previously described.

In accordance with another aspect of the present invention, an airport having a plurality of pavement areas, not including the runways, is provided. The airport includes a plurality of cameras, each one of the plurality of cameras pointing at a different part of the plurality of pavement areas and generating an image. It also includes a memory storing a plurality of background models, each one of the plurality of background to images corresponding to each of the plurality of cameras. It also includes a processor connected the memory and to the plurality of cameras.

In accordance with an aspect of the present invention, the processor processes the image as previously described.

Thus, the processor accesses the memory to obtain the background model corresponding to the one of the plurality of cameras whose image is being processed, receives the image directly or indirectly from the one of the plurality of cameras whose image is being processed, determines a foreground mask of the object from the background model corresponding to the one of the plurality of cameras whose image is being processed, determines a convex hull of the object from the foreground mask and labels the image of the object based on a ratio of foreground pixels in the foreground mask and a total number of pixels captured by the convex hull, wherein the object is labeled as not an airplane if the ratio exceeds a predetermined number.

DETAILED DESCRIPTION

Figure 1:
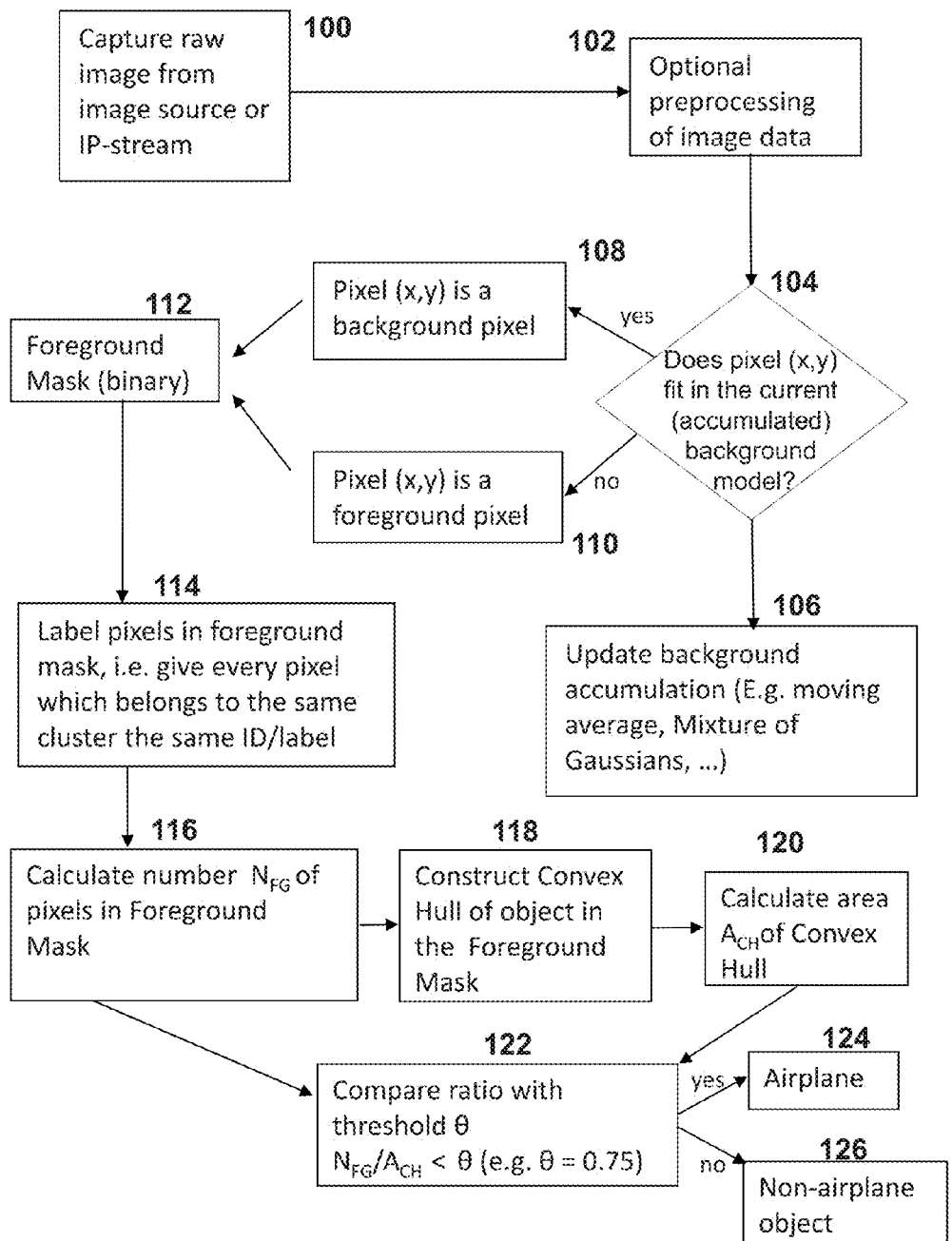
FIG. 1 illustrates a flow diagram of steps performed by a processor in accordance with various steps of the present invention.

In certain areas of an airport, such as runways, roll ways and park ways only airplanes are supposed to move and to be present, at least most of the time. For security reasons, it is beneficial to create an alert that indicates that an object not being an airplane is moving into or in a restricted area. It is not efficient or even desirable to have a person continuously watch surveillance monitors for such occurrences. For instance, many areas, each under surveillance by a camera, have sometimes constant movement on a screen of airplanes. A single person would have trouble to review each monitor constantly.

It is much more efficient to alert a person who has access to one or more surveillance monitors that an object not being an airplane is in a restricted space. Focused by such an alert, the person can review the image and determine if an object is allowed to enter the area. For instance, the object can be an aircraft refueling truck which is leaving the restricted area and is authorized to move in the restricted area. Accordingly, it is beneficial to have a computer system first decide from a camera image if an object, such as a moving object, is an airplane or not.

Assuming, for example, that airplanes are authorized to move in the restricted area, an alert for a moving airplane is not required. However, if an object or a moving object in a restricted area is not an airplane, then an alert should be generated which may focus the attention of a person to a monitor screen to assess the situation, or which initiates further processing of the alert by a computer.

One would like to conduct the surveillance of an area preferably in or close to real-time, possibly with a processor based computer, such as an off the shelf personal computer. Real-time herein means, in one embodiment of the present invention, a detection of the object within at least two video frames of camera images. In some cases a somewhat longer time may be allowed to process images. However, even in that case real-time in accordance with an aspect of the present invention is not longer than the time for an object to traverse half the field of vision of the camera. This means that an object will be detected and an alert generated before it has left the field of vision of the camera. This makes it possible to effectively monitor several areas of an airport by cameras with standard or commonly available equipment. Accordingly, the method provided herein with one or more aspects of the present invention relates to a computer based method for camera surveillance of an area, such as a pavement area of an airport to classify an object in such an area and to generate an alert.

In one embodiment of the present invention, an object is detected from a single image or frame of a sequence of images by analyzing a single frame and comparing it to a background model. In one embodiment of the present invention an analysis and classifying of an object in an image is achieved by comparing the single frame with an (accumulated) background model before a next frame in a sequence of frames is received. In one embodiment of the present invention two or more frames in a sequence of image frames are analyzed to determine or classify a presence of an object. For instance movement of the object and applying the history of movement may be applied to classify the object. In some cases this may increase the reliability of the classification.

It should be clear that analysis of images frames should preferably take place quickly or at least preferably before the object has left the field of view of a camera. In one embodiment of the present invention the processor classifies an object in a frame of a sequence of frames before the next frame is received. In one embodiment of the present invention the frame is a last one in a series of frames.

In one embodiment of the present invention the processor classifies an object in a frame of a sequence of frames within at least 0.5 second after the last frame that is processed has been received. In one embodiment of the present invention the processor classifies an object in a frame of a sequence of frames within at least 1 second after the last frame that is processed has been received. In one embodiment of the present invention, the processor classifies an object in a frame of a sequence of frames within at least 5 seconds after the last frame that is processed has been received. In one embodiment of the present invention the processor classifies an object in a frame of a sequence of frames within at least 20 seconds after the last frame that is processed has been received.

In one embodiment of the present invention, an object such as a car may drive quickly through an area and may escape visual monitoring by a human. A processor may be able to capture an image of the object and classify it even after the object has left the field of view of a camera. In such a case a processor may provide an alert and display on a display device an image capturing the object, provided with a correct classification and with a time stamp and a geo-location, for instance based on the positioning of the camera that captured the image. A display device herein in one embodiment is a visual display device such as a computer monitor or any other visual screen. A display device in one embodiment of the present invention is an audio device that provides a sound. A display device is one embodiment of the present invention is a tactile feedback device that provides a tactile signal such as a vibration that can be detected by a user.

An automatic visual surveillance system for these areas is given the task to alert when objects other than planes enter these areas and to display these objects on a screen.

A known technique to accomplish this task is motion analysis to separate moving objects and background in the image captured from a given camera. The result of such an analysis is a foreground mask, a binary image representation in which all pixels which have seen motion have a different value from pixels of the static background. Moving objects in the scene can then be classified looking at their speed and their size in this foreground mask.

This type of classification, which is different from methods provided herein in accordance with various aspects of the present invention, has the drawback that large trucks or other objects may have a similar size in the foreground mask as a plane and thus are classified as planes ("false positive" detection).

One aspect of the present invention is based on the inventor's realization that a shape of planes is essentially more complex than that of a truck such as a fuel truck or a luggage truck or a car. In accordance with an aspect of the present invention, a fast method is provided to determine a level of complexity respectively the lack of convexity, called herein the convex deficiency.

To measure the complexity of the shape of a moving object in the scene, in accordance with an aspect of the present invention, a processor creates a convex hull of the object from its representation in a foreground mask. A processor then calculates the deviation of the shape object representation in the foreground mask from the convex hull ("convex deficiency"). In accordance with an aspect of the present invention, this is done by the processor by calculating a ratio of the number of pixels of the object in the foreground mask and of the area of its convex hull. The lower this ratio is the higher the deviation is thus the higher the complexity of the shape.

In accordance with an aspect of the present invention the processor applies a threshold to this ratio and analyzes the result over time which provides the information for the classification of the object.

A convex hull of a set of points (such as pixels) is commonly the (smallest) convex polygon that includes all the points of the set. Methods for determining a convex hull are well known. The reference "Survey of Algorithms for the Convex Hull Problem", Valentina Bayer, Oregon State University, Mar. 19, 1999, describes some of these algorithms and is incorporated herein by reference in its entirety. A fast Convex Hull Algorithm is described in Xianquan Zhang, Zhenjun Tang, "A fast Convex Hull Algorithm for Binary Image", Informatica 34 (2010) 369-376" and is also incorporated herein by reference in its entirety. Any of the known and described steps can be used in embodiments of the present invention.

There are various different methods to determine a Convex Hull in a multi-dimensional space, including a two-dimensional space and a three-dimensional space. As an example of Convex Hull creation the use of the known "gift wrapping" Convex Hull approach is provided further down below.

The inventor has recognized that airplanes generally have large airfoils including wings and stabilizers attached to a relatively simply shaped fuselage. Processing of an image of an airplane by a processor with a convex hull program generally results into a rather extensive convex hull description that does not closely follow the actual shape or contour of the plane. The image of the plane inside the convex hull will show significant space between the image and the convex hull. The inventor has also recognized that objects like vehicles have a much more "box-like" appearance with seldom large outliers in connecting parts. The convex hull of a foreground mask of an image of such objects will much closer follow a contour of the actual shape.

This distinction between a foreground mask of an object and its related convex hull will be applied herein as an aspect of the present invention to perform a rapid classification of an object as being either complex ('an airplane') or non-complex ('a vehicle') from images taken from an area on an airport where both vehicles and airplanes can appear. In accordance with an aspect of the present invention, a processor determines a convex deficiency from the convex hull.

Steps performed by a processor, which is part of a computer, in accordance with various aspects of the present invention are shown in FIG. 1 and will be explained below.

As an initial step an image is created from the area under surveillance as a background image which is developed into a background model. The processor compares current images against a background model to determine "new" pixels that have appeared. In accordance with one aspect of the present invention, the background model of an area can be updated on a regular basis, for instance, by creating an accumulated background through moving average methods, Mixture of Gaussians or in any other way that is useful. (See step 106 in FIG. 1).

In accordance with an aspect of the present invention, a model of the background is created by the processor, for instance over a period of time, wherein each pixel in the background model is assigned a mean value and a deviation from the mean that is established over time. In one embodiment of the present invention at each update of the background model the value of a pixel (which is preferably a grey value) which is not a foreground pixel in a defined coordinate in the image is applied to calculate a new mean value of the pixel values over time in each coordinate in the background and the deviation from the mean. In one embodiment of the present invention, the update of the background model applies an additional filtering such as a moving average or dropping contributing data beyond a certain period. This addresses issues like changing lighting conditions during the day or moving into dawn or dusk, clouds and the like. The background model thus is no longer a true image wherein each coordinate in an image has a fixed pixel value, but more of a model, which in one case is a probabilistic model.

An update of the background can take place once every second or once every hour or one every period between once a second and once an hour. In one embodiment of the present invention the processor updates the model based on a threshold value of a difference of a current pixel with a mean. Based on a value shift into one direction, for instance pixels which are decided by the processor to be in the background become lighter relative to earlier pixels with the same coordinates may increase the dropping of contributions of darker pixels to the background model. In one embodiment the processor is programmed to learn such trends in changing background and adapt the background parameters to those changes and the threshold to determine what is background and foreground. In a further embodiment of the present invention, one can characterize a background image, by dividing the image area in blocks and learning descriptors such as histograms which characterize the corresponding image blocks.

Accordingly, a background for processing the acquired surveillance image in one embodiment of the present invention is a background image. In one embodiment of the present invention a background is an updated background image. In one embodiment of the present invention a background is a set of parameters associated with a set of coordinates, preferably two dimensional coordinates in an image of a scene, each parameter set being characterized for instance by a mean and a deviation. For detection a processor compares a pixel with a coordinate set in a current image with a parameter set in the background at the same coordinate set characterized by a mean and a deviation. One detection criterion, in accordance with an aspect of the present invention, is to determine the value of a pixel in the current image and compare it to the mean of the corresponding parameter set in the background.

For instance, if the value of the current pixel falls within 2 standard deviations (or any other applicable threshold) around the mean in the parameter set of the corresponding background element (which may be called a 'pixel' but is really a model of a pixel) then the pixel in the current image is considered to be part of the background. If not, the pixel in the current image is determined to be part of an object not in the background and is labeled as foreground.

The processor, by updating the background over time, thus actually learns a background. The learned or processed background may no longer be an actual image in some cases, but rather a characterization such as a probabilistic characterization of background pixels. For that reason, it is preferred to refer to a background that may include an actual background image or a processed background that is learned, as a 'background model' herein rather than as a 'background image.'

In a step 100, an image, which may be a raw image, is obtained by the processor from an image source such as a camera or is provided as image data via a network to the processor. The camera may be a common camera such as a digital camera. The camera may also be an infra-red or a thermal camera. A thermal camera allows the system to work during the night, even if image areas are not actively illuminated, as it records radiation generated by an object even in the absence of an external illumination source. The camera is directed to an area under surveillance.

In a step 102, the processor may perform optional preprocessing of the image data, including filtering, enhancement, equalization and threshold determination, smoothing, edge enhancement and the like. In one embodiment of the present invention, all pixels may be provided with an equivalent grey scale value. If the current image is processed in grey scale, then the background image or a related background model also has to be in grey scale.

The pixels in the current image (which may have been preprocessed) are compared (step 104) with the pixels or elements in the background model, which may be an accumulated background image. If the pixel value in a current image exceeds a threshold value compared with a corresponding element in the background model, which may cover a natural variance in pixel intensity, the pixel is assigned a 'foreground' label (step 110). If the pixel in the current image does not differ sufficiently from a corresponding pixel or element in the (accumulated) background or background model, the pixel is labeled as background (step 108). In one illustrative example, a processor determines in a location in a current image a grey scale pixel value and compares it to the mean value with a deviation value associated with the corresponding location in the background model. If the pixel value is exceeds two deviation values of the mean, the pixel in the current image is decided by the processor to be not part of the background and is determined to be foreground.

In step 112, a binary foreground mask is created. This is done by analyzing the pixels which were identified as being 'foreground.' The foreground pixels are clustered into groups or clusters of connected pixels. This can be done using a structural analysis where all pixels are iteratively scanned. All pixels which are connected with a sufficient number of neighboring pixels are given the same label. In another embodiment of the present invention this clustering is done by a centroid based approach, e.g. a k-Means approach.

One may impose a minimum size on what is to be considered a cluster. If a group of foreground pixel has for instance less than 10 connected pixels the processor may ignore the foreground pixels.

In step 114, the pixels in a single cluster are each given a label corresponding to that cluster to create a foreground mask. All foreground pixels have identical values (for instance black) as do the background pixels (which all will be for instance white) to create a binary image.

A binary image is created from the foreground mask. Herein a binary image is an image wherein each pixel has one of 2 values. In a further embodiment of the present invention a binary image is an image wherein a value of a pixel is 0 or 1.

In step 116, the processor determines the number $N_{FG}$ of foreground (black) pixels in a foreground mask of pixels belonging to a certain cluster. In step 118, the processor constructs the convex hull of this cluster in the foreground mask and calculates, in step 120, the equivalent pixel area $A_{CH}$ of the convex hull in the foreground mask.

In step 122, the processor determines the ratio $N_{FG}/A_{CH}$ of the foreground mask, which may be called the convex deficiency, and compares it with a threshold value (for instance 0.75). A 'box-like' object like a vehicle in general has a foreground mask ratio or convex deficiency that is larger than 0.75. An airplane has a convex deficiency or a foreground mask ratio that is around 0.75 or smaller than 0.75. In a further embodiment of the present invention an airplane has a convex deficiency or a foreground mask ratio that is around 0.80 or smaller than 0.80. The threshold can vary depending on the application such as type of cameras used (thermal or visible light) and circumstances and can be determined experimentally. In one embodiment of the present invention a detection ratio for an airplane is set at a convex deficiency ratio of about or less than 0.85.

Based on the comparison of convex deficiency ratio or the foreground mask ratio the processor decided in step 124 that the object is a plane (for instance a convex deficiency ratio≤0.75) or in step 126 (a convex deficiency ratio>0.75) that the object is not an airplane.

One can tune the threshold ratio for different objects. It has been found that airplanes in general and in images from different directions have a convex deficiency ratio that is preferably smaller than 0.85 or more preferable smaller than 0.80 or most preferable smaller than 0.75.

If the convex deficiency ratio indicates an object that is not a plane then the processor may generate an alert, for instance to draw the attention of a person to for instance a surveillance screen. The processor may also indicate on a map that is displayed on a computer screen where the object determined to be not an airplane is positioned. The processor in one embodiment of the present invention performs the above analysis for succeeding video frames of image data and thus can track a moving object and provide and display information about speed and direction of the object.

In a further embodiment of the present invention, the processor detects an object not being an airplane entering a field of view of a camera. Even if the object stops moving, the processor can provide an alert about an object that has entered a restricted area. The processor may be configured in such a manner that only after a manual interference the object is made part of the background and no alert is being generated.

In general, one would expect airplanes to move around at the airport locations. Sometimes, certain areas are for instance under construction and no airplanes should be present. In that case the processor can be programmed to generate an alert if any object is detected at a certain area, or if an airplane is detected at a certain area.

Figure 2:
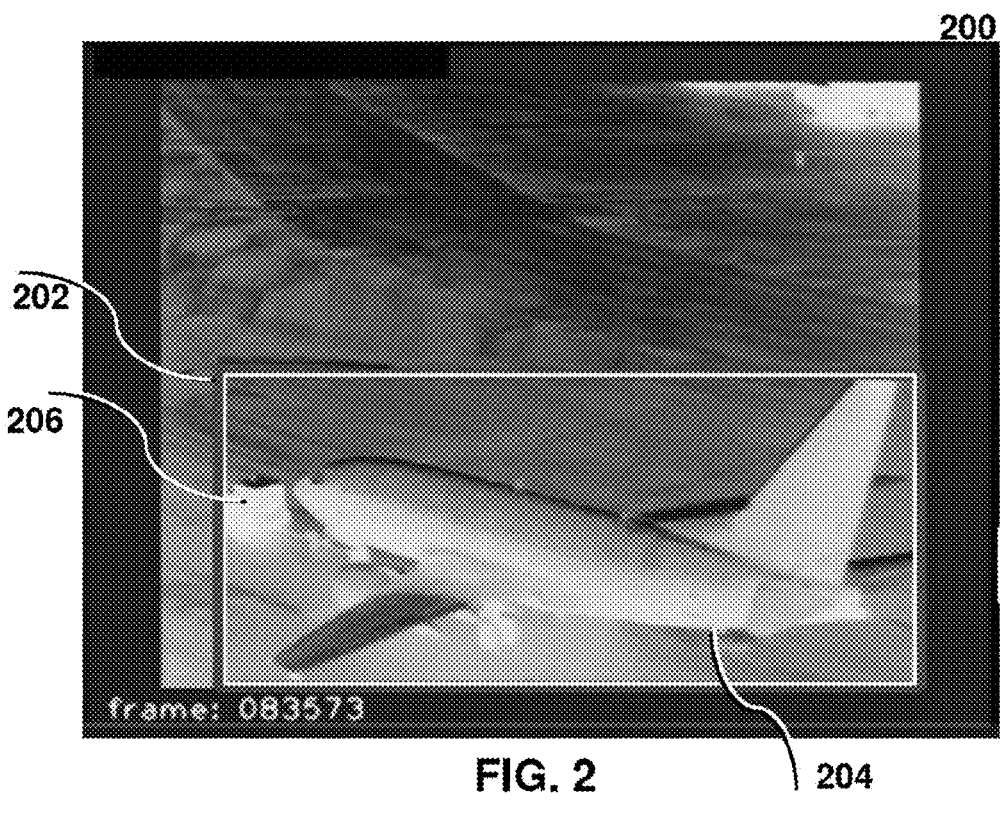
FIG. 2 is a thermal image of an area of an airport containing an airplane, in accordance with an aspect of the present invention.

FIG. 2 illustrates a frame 200 of a video image of an airplane 204 taken by a thermal camera. A window 202 in 200 identifies pixels that are different from the background model.

Figure 3:
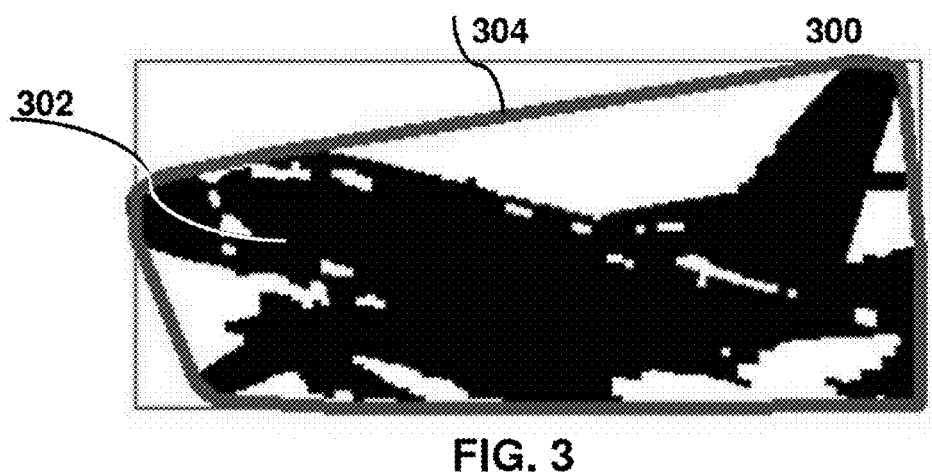
FIG. 3 is a cluster of pixels as a foreground mask generated from a current image and a background model and a convex hull of the foreground mask generated in accordance with one or more aspects of the present invention.

FIG. 3 shows in 300 the binary foreground model 302 of the airplane, including a small tow tug truck and the generated convex hull 304. One can see that the ratio black to total area inside 304 is clearly less than 100% and is actually less than 75%.

Because the small size of the tow truck which is identified as 206 in FIG. 2, the influence of this truck is negligible in the analysis. In one embodiment of the present invention, one can process the clusters in such a manner that thin lines of pixels that connect clusters will be ignored, thus creating separate clusters that can be analyzed separately.

Figure 4:
FIG. 4 is another thermal image of an area of an airport containing an airplane, in accordance with an aspect of the present invention.
Figure 5:
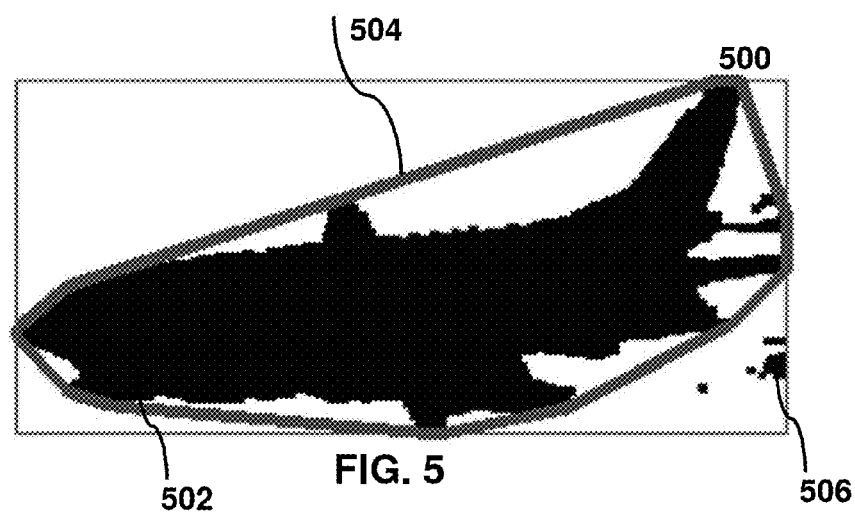
FIG. 5 is another cluster of pixels as a foreground mask generated from a current image and a background model and a convex hull of the foreground mask generated in accordance with one or more aspects of the present invention.
Figure 6:
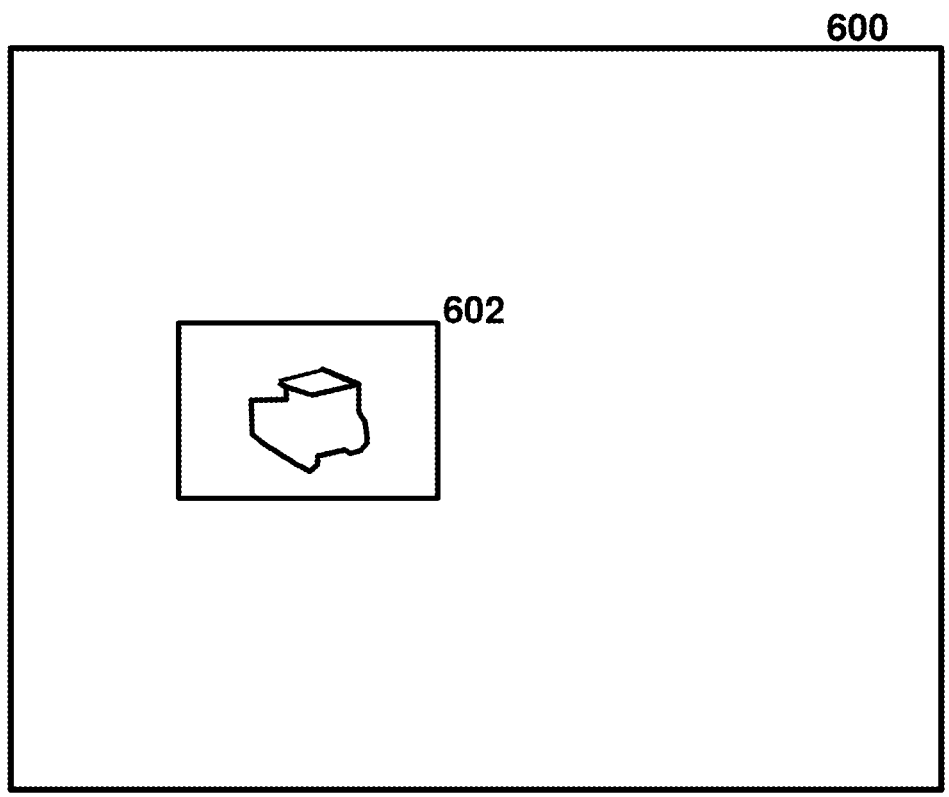
FIG. 6 is a diagram of another thermal image of an area of an airport containing a tow truck, in accordance with an aspect of the present invention.

Another example is provided in FIGS. 4 and 5. In FIG. 4, a thermal image in a video frame 400 is analyzed and a window 402 is identified with foreground pixels. FIG. 5 shows in 500 the foreground mask with convex hull 504. One can see an un-connected cluster 506 that is ignored by the processor. The shape of the foreground mask 502 is larger than the actual shape of the contour of the plane. Radiation from the plane reflected on the ground causes this.

It is noted that the image of FIG. 4 has sufficient contrast to allow an actual image segmentation. In one embodiment of the present invention, a foreground-background segmentation is applied to the plane. A convex hull of the segmented airplane would give an improved detection ratio.

Figure 7:
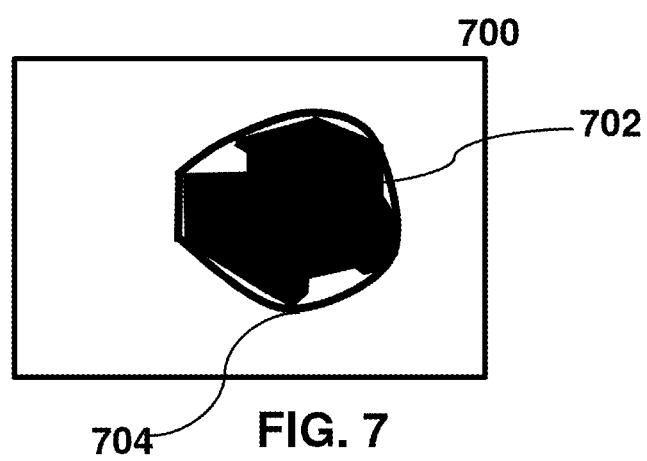
FIG. 7 is a cluster of pixels as a foreground mask generated from a current image and a background model and a convex hull of the foreground mask of the tow truck generated in accordance with one or more aspects of the present invention.

For illustrative purposes, a diagram 600 is provided of a detection of a tow tug truck in an image window 602. The foreground mask 702 is shown in diagram 700 in FIG. 7 with a convex hull 704. The truck is much more 'box-like' and the convex hull closely follows the contour of the truck, providing a foreground mask ratio that is greater than 0.75.

Trucks may have attachments, such as thin antennas, that may skew the result. In one embodiment of the present invention as a preprocessing step, the original image is processed to remove thin lines from the foreground. The lines that are removed or ignored preferably are 1 pixel wide or at most 5 pixels wide or at most 10 pixels wide.

Figure 8:
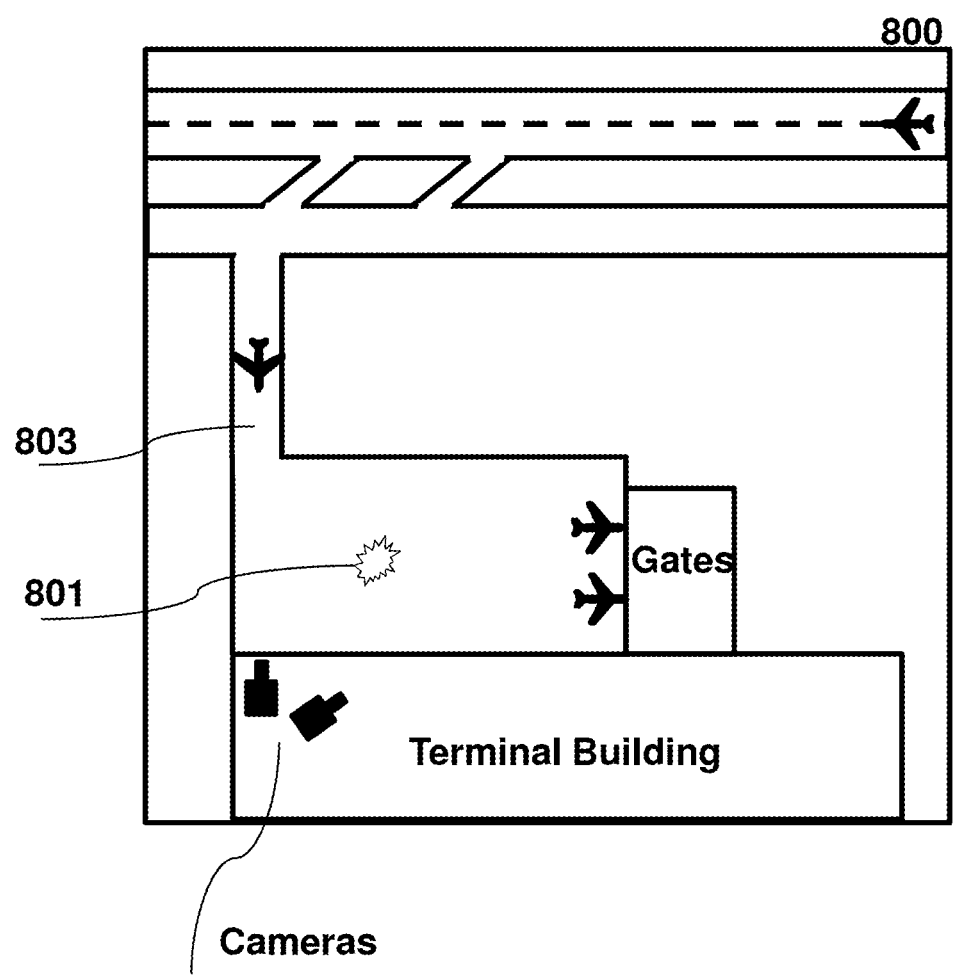
FIG. 8 illustrates a computer display with a map of an airport in accordance with an aspect of the present invention.

FIG. 8 illustrates a map 800 of an airport area under surveillance by cameras on top of a terminal building and providing images to a system enabled to perform the steps as provided above in accordance with various aspects of the present invention. More specifically the cameras enable a surveillance of a pavement area of an airport. Relevant borders of the pavement areas such as a roll way (803) and park way areas are displayed as lines on the display. The system detects an object and provides an alert indicating on the screen also a location 801 where the object not being an airplane has been detected. Other data of the alert includes a number of a monitor where details can be viewed. The processor may also automatically open a window with an image from the camera pointed at the alert area. An alert and possibly an image may be transmitted to a remote computer system for review and logging purposes. An alert with an indication of an object may also be provided with geo-positional data and/or a time-stamp.

In one embodiment of the present invention, an alert and/or an image of the area under surveillance is transmitted automatically and wirelessly to a mobile computing device enabled to receive and display the alert and the image. Such a mobile computing device may be a smart phone or a tablet that is carried by a mobile person who may be tasked with monitoring security events at the airport. Such a mobile computing device may also be located in a vehicle of which an occupant can respond to a security event. In one embodiment of the present invention the analysis of the images in accordance with steps of the present invention are performed by a processor on a mobile and portable computing device, which may include a smart phone, a tablet or a portable computer.

Figure 9:
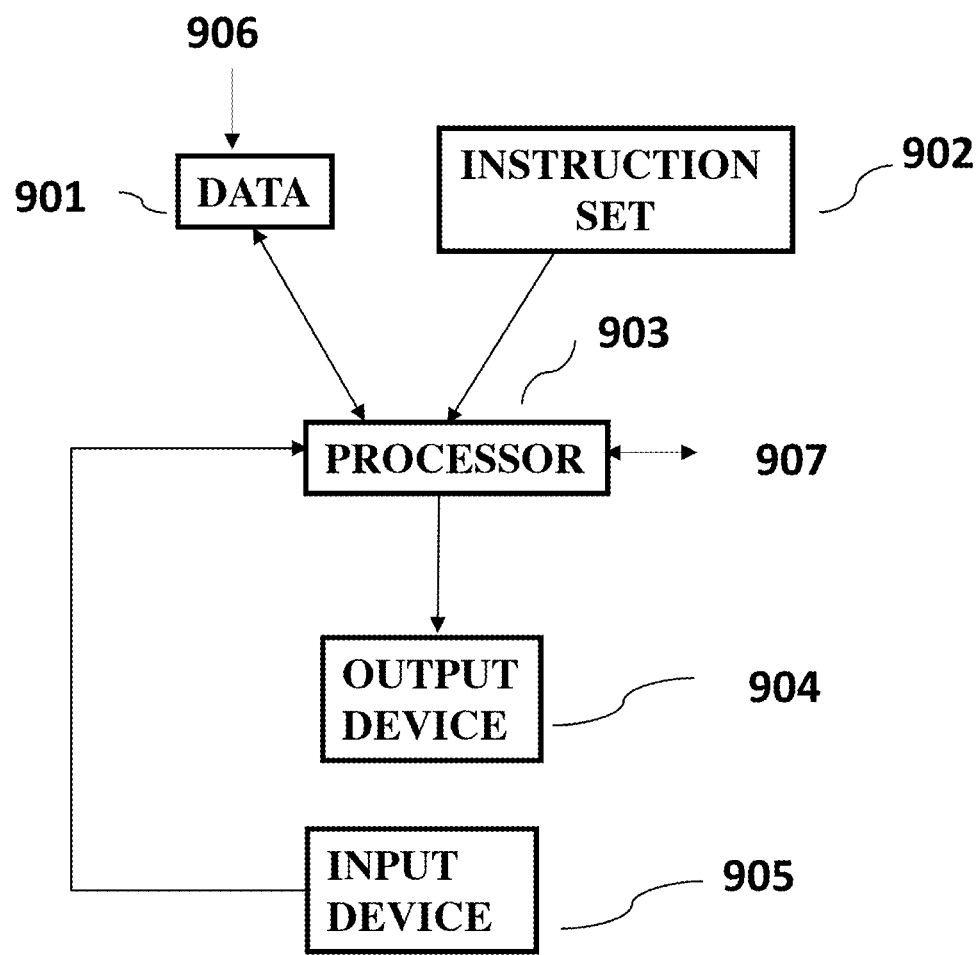
FIG. 9 illustrates a processor based system or computer enabled to execute instructions to perform the classifying methods provided in accordance with various aspects of the present invention.

In one embodiment of the present invention, the camera and the computer or computing device enabled to perform the methods or steps of the methods as provided herein with one or more aspects of the present invention is part of a computer system. The methods as provided herein are, in one embodiment of the present invention, implemented on a system or a computer device. Thus, steps described herein are implemented on a processor, as shown in FIG. 9. The system illustrated in FIG. 9 and as provided herein is enabled for receiving, processing and generating data. The system is provided with data that can be stored on a memory 901. Data may be obtained from a sensor such as a camera or from any other data relevant source. Data may be provided on an input 906. Such data may be image data or any other data that is helpful in a vision system. The processor is also provided or programmed with an instruction set or program executing the methods of the present invention that is stored on a memory 902 and is provided to the processor 903, which executes the instructions of 902 to process the data from 901. Data, such as image data or any other data provided by the processor can be outputted on an output device 904, which may be a display to display images or a data storage device. The processor also has a communication channel 907 to receive external data from a communication device and to transmit data to an external device. The system in one embodiment of the present invention has an input device 905, which may include a keyboard, a mouse, a pointing device, one or more cameras or any other device that can generate data to be provided to processor 903.

The processor can be dedicated or application specific hardware or circuitry. However, the processor can also be a general CPU or any other computing device that can execute the instructions of 902. Accordingly, the system as illustrated in FIG. 9 provides a system for processing data resulting from a camera or any other data source and is enabled to execute the steps of the methods as provided herein as one or more aspects of the present invention.

Figure 10:
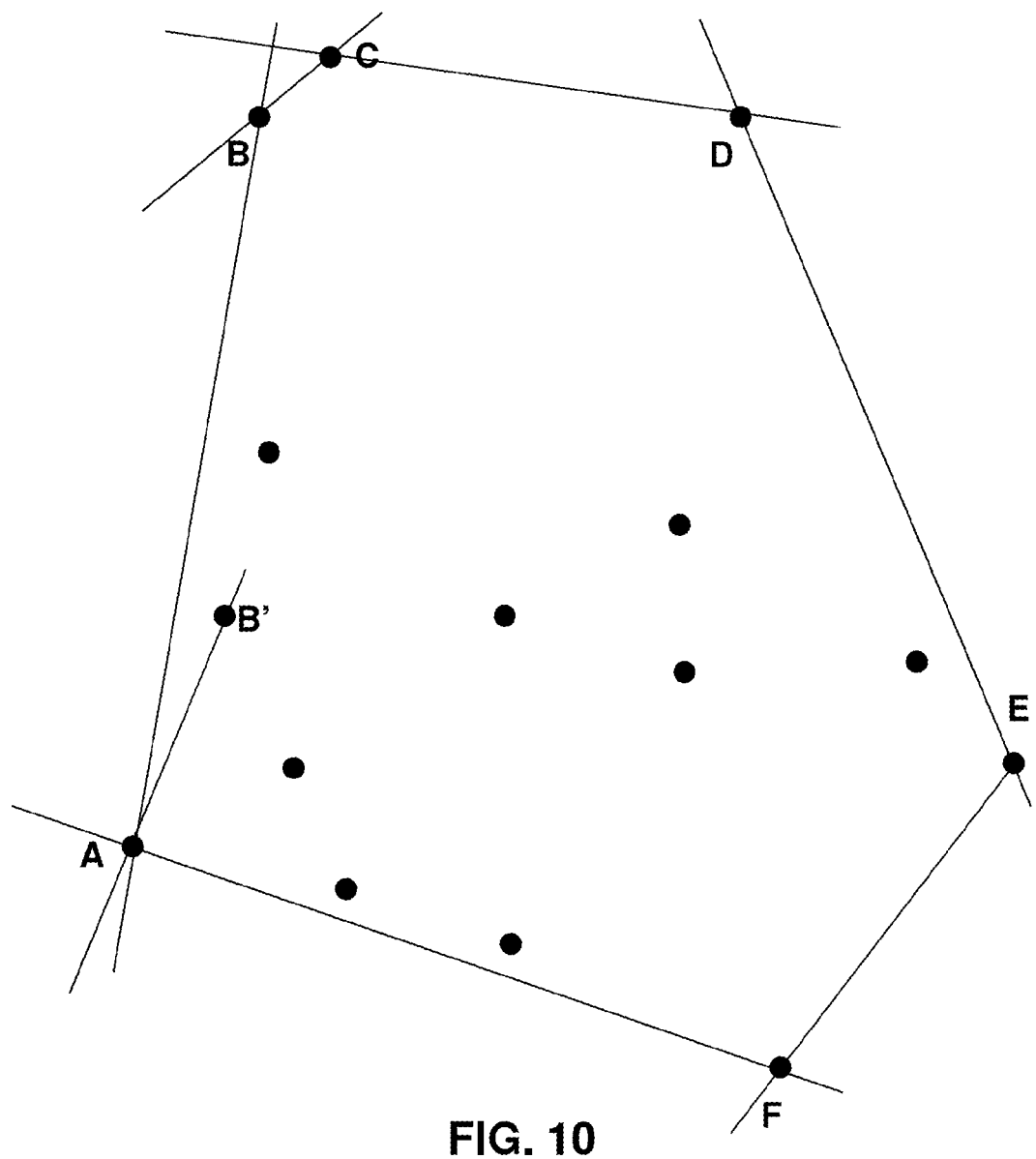
FIG. 10 illustrates a method to create a convex hull in an image.

FIG. 10 illustrates a method of creating a convex hull from pixels or points in a two dimensional space. The relevant pixels or point are shown as black dots. The processor begins by selecting a point with an extreme coordinate value, for instance the most far left point A. Point A is the first point on the hull. The processor then searches for the next point X with an x coordinate in this case in such a manner that all other points not yet assigned to the hull are to the right of AX going from A to X. The processor performs an exhaustive search. In one case it may initially find point B'. However, further into the search the processor detects that point B lies to the left of AB' and thus does not meet the requirement of being to the right of AB'. The processor cannot find any other point lying to the left of AB and assigns point B to the hull. The processor then searches for the point C so that all not assigned points are to the right of BC. The above steps are repeated until the lines CD, DE, EF and FA have been found. As soon as the processor finds the point A again (in FA) the processor knows that a loop or hull has been formed and the process can stop. The hull formed based on the above requirements will always form a convex hull. This method is known as "gift wrapping" and can be applied as one step of the plurality of steps provided in accordance with at least one aspect of the present invention. Other Convex Hull methods are known and may also be applied.

While there have been shown, described and pointed out fundamental novel features of the invention as applied to preferred embodiments thereof, it will be understood that various omissions and substitutions and changes in the form and details of the methods and systems illustrated and in its operation may be made by those skilled in the art without departing from the spirit of the invention. It is the intention, therefore, to be limited only as indicated by the scope of the claims.

The invention claimed is:

1. A method for classifying differently shaped objects in an image of a scene, wherein a processor can access a background model of the scene, comprising:
providing to the processor image data of an object in the scene of at least a section of an airport;
the processor determining a foreground mask of the object separate from the background model by combining foreground pixel clusters that are connected, including determining a size of an area occupied by pixels in the foreground mask;

the processor determining a single convex hull of the object from the foreground mask and that surrounds the foreground mask, including a size of an area determined by the single convex hull; and the processor classifying the object in the image as being an airplane or not an airplane based on a ratio between the size of the area occupied by pixels in the foreground mask and the size of the area determined by the single convex hull by comparing the ratio with a threshold value and the processor classifying the object as not being an airplane if the ratio is greater than 0.75.

2. The method of claim 1, wherein the foreground mask is formed by the processor comparing each of a plurality of pixels in the image data of the object with a corresponding pixel in the background model to determine whether each of the plurality of pixels is a foreground pixel.

3. The method of claim 2, wherein all foreground pixels have a first pixel value and belong to a single cluster of foreground pixels.

4. The method of claim 3, wherein all background pixels have a second pixel value.

5. The method of claim 1, wherein the background model is periodically updated by the processor.

6. The method of claim 5, wherein the updated background model is a learned background.

7. The method of claim 1, comprising the processor setting an alarm when the processor determines that the object is not an airplane.

8. The method of claim 1, wherein the scene is of an airport and the object is not an airplane and the processor provides on a map displayed on a computer display a location where the object is located.

9. A system for classifying differently shaped objects in an image of a scene, comprising:
   a memory storing a background model of the scene;
   a thermal camera that captures the object in the image of the scene;
   a processor that can access the memory, the processor performing the steps of:
      accessing the memory to obtain the background model of the scene;
      receiving the image of the scene;
      determining a foreground mask of the object separate from the background model by combining foreground pixel clusters that are connected, including determining a size of an area occupied by pixels in the foreground mask;
      determining a single convex hull of the object from the foreground mask and that surrounds the foreground mask, including a size of an area determined by the single convex hull; and
      classifying the object in the image as being an airplane or not an airplane based on a ratio between the size of the area occupied by pixels in the foreground mask and the size of the area determined by the single convex hull by comparing the ratio with a threshold value.

10. The system of claim 9, wherein the foreground mask is formed by the processor comparing each of a plurality of pixels in the image data of the object with a corresponding pixel in the background model to determine whether each of the plurality of pixels is a foreground pixel.

11. The system of claim 10, wherein all foreground pixels have a first pixel value and belong to a single cluster of foreground pixels.

12. The system of claim 9, wherein the background model is periodically updated by the processor.

13. The system of claim 12, wherein the updated background model is a learned background model.

14. The system of claim 9, wherein when the ratio is greater than 0.75 the processor determines that the object is not an airplane.

15. An airport having a plurality of pavement areas, not including runways, comprising:
   a plurality of cameras, each one of the plurality of cameras pointing at a different part of the plurality of pavement areas and generating an image;
   a memory storing a plurality of background models, each one of the plurality of background models corresponding to each of the plurality of cameras;
   a processor connected the memory and to the plurality of cameras;
   wherein the processor processes the image from each of the plurality of cameras to classify an object in the image by:
      accessing the memory to obtain the background model corresponding to the one of the plurality of cameras whose image is being processed;
      receiving the image directly or indirectly from the one of the plurality of cameras whose image is being processed;
      determining a foreground mask of the object separate from the background model corresponding to the one of the plurality of cameras whose image is being processed by combining foreground pixel clusters that are connected, including determining a size of an area occupied by pixels in the foreground mask;
      determining a single convex hull of the object from the foreground mask and that surrounds the foreground mask, including a size of an area determined by the single convex hull; and
      classifying the object in the image as being an airplane or not an airplane based on a ratio of foreground pixels in the foreground mask and a total number of pixels captured by the single convex hull, wherein the object is classified as not an airplane if the ratio exceeds a predetermined number.

16. The airport according to claim 15, wherein determining the foreground mask, includes removing or ignoring pixels from the image corresponding to thin lines representative of antennas.

17. The system according to claim 9, wherein determining the foreground mask, includes removing or ignoring pixels from the image corresponding to thin lines representative of antennas.

18. The method according to claim 1, wherein determining the foreground mask, includes removing or ignoring pixels from the image data corresponding to thin lines representative of antennas.

* * * * *